E. S. COLE.
APPARATUS FOR MEASURING THE FLOW OF A LIQUID STREAM.
APPLICATION FILED JAN. 14, 1914.
1,229,718.
Patented June 12, 1917.
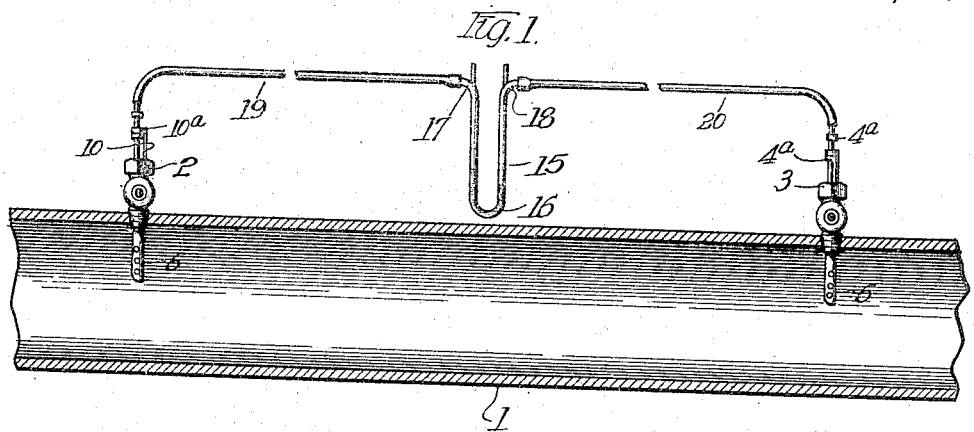
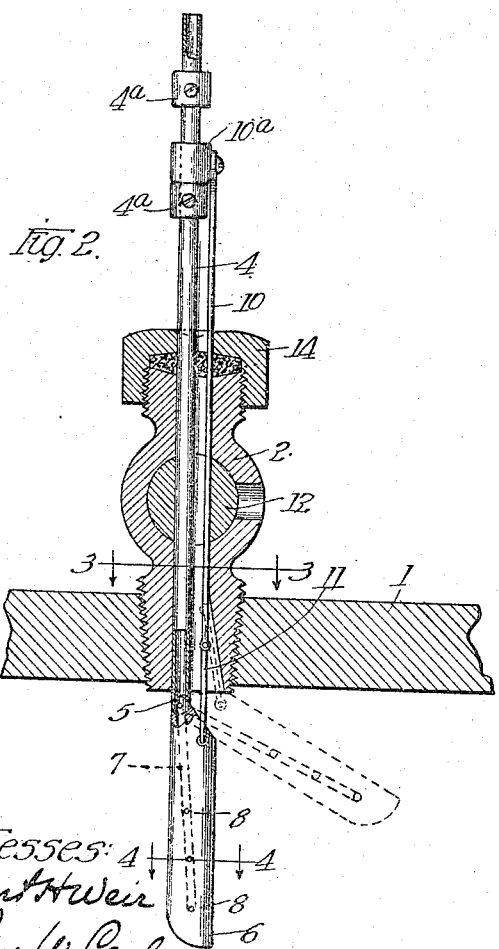
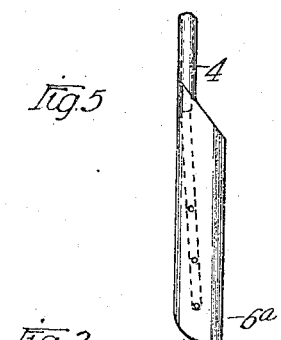
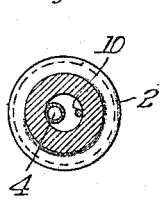
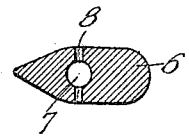
Witnesses:
Robert H. Weir
Arthur W. Carlson
Inventor
Edward S. Cole

UNITED STATES PATENT OFFICE.

EDWARD S. COLE, OF NEW YORK, N. Y.

APPARATUS FOR MEASURING THE FLOW OF A LIQUID STREAM.

1,229,718. Specification of Letters Patent. Patented June 12, 1917.

Application filed January 14, 1914. Serial No. 811,985.

*To all whom it may concern:*

Be it known that I, EDWARD S. COLE, a citizen of the United States, residing at New York city, in the county of New York and State of New York, have invented a certain new and useful Improvement in Apparatus for Measuring the Flow of a Liquid Stream, of which the following is a full, clear, concise, and exact description, reference being had to the accompanying drawings, forming a part of this specification.

My invention relates to apparatus for measuring the flow of a liquid stream, especially in a pipe or conduit.

Prominent objects of the invention are to provide a simple, practical and inexpensive form of apparatus of this sort; to secure a high degree of accuracy in the measurement of the current flow; to avoid having the apparatus interfered with or put out of order by extraneous matter, such as moss, weeds, and so on in the flowing stream; to arrange for effective operation irrespective of the size of the pipe or conduit in which the stream is flowing; and to secure the foregoing and other desirable results in a simple and expeditious manner.

In the accompanying drawings, Figure 1 is a view of a pipe or conduit and an apparatus for measuring the flow of a current, or stream therein embodying my invention;

Fig. 2 is a vertical section of a portion of the apparatus;

Figs. 3 and 4 are horizontal sections taken on lines 3—3 and 4—4 respectively, in Fig. 2;

Fig. 5 is a view of a portion of a modified form of apparatus.

In the drawings, I show a tube or pipe 1 in which a liquid stream is understood to be flowing. This tube or pipe may represent a water main of a municipal water system, or other pipe or conduit containing a flowing stream whose velocity it is desired to measure. At separated points in this tube or conduit I show plugs or cocks 2 and 3, which are screwed into the wall of the pipe or conduit 1 and provide an entry way for devices which are introduced into the interior of the tube or pipe. This apparatus involves a tube 4 which extends down and is pivotally connected as at 5, with a member 6 in the form of a blade or rod, and which is intended to project well into the interior of the pipe or conduit. This member 6 may be in any suitable shape or form, but is desirably made of somewhat oval cross section, as shown in Fig. 4. It is provided with a longitudinally extending duct or passage 7 which communicates with the interior of the tube 4 and it is also provided with a series of side apertures 8—8, which communicate at intervals with the duct 7, there being apertures 8—8 on both sides of the member. This blade or member 6 is arranged with its longer cross sectional dimension lengthwise of the pipe or conduit, and the apertures 8—8 opening at the sides of the member 6, that is neither up stream nor down stream. By this arrangement no orifice is presented to the oncoming stream, so that there is no danger from moss or weeds or other matter working into the orifice and becoming clogged. On the other hand by this arrangement the orifices are presented sidewise to the stream, so that if anything there is perhaps a small suction tending to keep the orifices open and clear.

As an arrangement for easily adjusting the member 6 about its pivotal connection with the tube 4, I show a rod 10 which runs lengthwise of the tube 4 down into the pipe 1 and is pivotally connected with the upper side portion of the member 6 so that by shifting the rod 10 longitudinally in a vertical direction the member 6 is swung up and down as shown in dotted lines in Fig. 2, it being understood that the rod 10 has at its lower end a pivoted link member 11 to permit this swinging motion. As a convenient arrangement for adjusting the rod 10 I show a collar 10$^a$ mounted upon the upper portion of the tube 4 and connected with the rod 10, the collar 10$^a$ being arranged to slide or work between fixed collars 4$^a$, 4$^a$, on the tube 4 to permit a proper extent of movement of the rod 4. The cock or plug 2 is provided with a valve 12 and a stuffing-box 14, by which the device can be introduced into and withdrawn from the interior of the tube and the water or other liquid in the pipe or tube prevented from escaping.

An apparatus of this kind is introduced into the tube or pipe 1 through each of the cocks 2 and 3, so that there are at separated points in the pipe a series of apertures opening sidewise to the liquid in the pipe. These devices introduced through the cocks 2 and 3 may be called pressure receiving members, and they are separated a substantial distance apart so that there will be a difference in the head or pressure of the water or other liquid in the pipe at the two points where these members are situated. This loss of head may be measured by some suitable apparatus, one form of which I have shown in Fig. 1, being a U tube 15, containing a heavy liquid 16, such as mercury, and the ends of this U tube, 17 and 18, are connected by pipes 19 and 20 respectively with the tubes 4—4 of the members in the cocks 2 and 3 respectively. Thus the difference in head or pressure at the two members will be indicated by the condition of the heavy liquid in the tube 15, and this may be measured and the flow of liquid computed accordingly.

In Fig. 5 I show a modified form of arrangement having a blade or member $6^a$ very similar to the blade or member 6 previously described, but this blade $6^a$ is rigidly secured to the bottom of the tube 4, instead of being pivoted thereto.

It will be understood that changes and modifications may be made without departing from the spirit of the invention.

What I claim is:

1. The combination with a pipe or conduit, of a pair of devices situated a distance apart along the length of said pipe or conduit, and provided with members projecting into the interior of the pipe or conduit, said members having side apertures and a duct or passage communicating with said apertures, and means connected with the ducts or passages of said devices for indicating the loss of head or pressure at said devices.

2. The combination of a supporting rod having a duct or passage, a device carried by said rod and provided with apertures and also with a duct or passage communicating with said apertures, and also communicating with the duct or passage in said supporting rod, said device being mounted for adjustment relatively to said supporting rod while at the same time maintaining the duct or passage therein in communication with the duct or passage in said rod.

3. A pressure receiving device comprising a member adapted for insertion into a flowing stream and provided with side apertures, and also with a duct or passage communicating with said apertures, said member being mounted for swinging movement or adjustment to vertically adjust said apertures, and means for swinging the same.

4. A pressure receiving device comprising a member adapted for insertion into a flowing stream and provided with side apertures, and a duct or passage communicating with said apertures and extending to one end of said member, said member being pivotally mounted at the end to which said duct or passage is extended to permit its being swung up and down in the flowing stream, and means for swinging said member.

5. A pressure receiving device comprising a member adapted for insertion into a flowing stream, said member being provided with side apertures, and a passage or duct extending upwardly to its upper end and connected with said side apertures, and a tube to which the upper end of said member is connected, said duct or passage being in communication with the bore of said tube.

6. A pressure receiving device comprising a member adapted for insertion into a flowing stream, said member being provided with side apertures, and a passage or duct extending upwardly to its upper end, and a tube to which the upper end of said member is pivotally connected, said duct or passage being in communication with the bore of said tube.

7. A pressure receiving device comprising a member adapted for insertion into a flowing stream, said member being provided with side apertures and a passage or duct communicating with said apertures and extending upwardly to its upper end, a tube to which the upper end of said member is pivotally connected and with which said duct or passage communicates, and a jointed rod extending lengthwise of the tube and connected with said member for adjusting the same.

8. A pressure receiving device comprising a member adapted for insertion into a flowing stream, said member being provided with side apertures and a passage or duct communicating with said apertures and extending upwardly to its upper end, a tube to which the upper end of said member is pivotally connected and with which said duct or passage communicates, a jointed rod extending lengthwise of the tube and connected with said member for adjusting the same, and a collar around said tube to which said rod is connected, whereby the sliding movement of said collar will produce a longitudinal movement of said rod.

9. In a meter, a blade member having a longitudinally extending duct or passage, and also having side apertures opening on the opposite sides of said member and communicating with said duct or passage.

10. In a meter a blade member of substantilaly less width than length and provided with side apertures, and a longitudinal duct or passage connected with said apertures, said blade having its forward edge sharpened.

In witness whereof, I hereunto subscribe my name this 22nd day of December, A. D., 1913.

EDWARD S. COLE.

Witnesses:
H. P. S. MATTE,
J. W. PUTNAM.